United States Patent
Sze et al.

[15] 3,642,465
[45] Feb. 15, 1972

[54] PROCESS FOR THE PRODUCTION OF HIGHLY PREREDUCED OXIDE PELLETS

[72] Inventors: Morgan C. Sze, Upper Montclair, N.J.; William V. Bauer, New York, N.Y.; Raymond H. Long, Morristown; Ward J. Bloomer; Richard T. Whitehead, both of Westfield, all of N.J.

[73] Assignee: The Lummus Company, Bloomfield, N.J.

[22] Filed: June 16, 1969

[21] Appl. No.: 833,761

[52] U.S. Cl. .................................................. 75/4
[51] Int. Cl. ............................... C21b 1/28, C22b 1/24
[58] Field of Search .................................... 75/3–5

[56] References Cited

UNITED STATES PATENTS

| | | |
|---|---|---|
| 3,351,459 | 11/1967 | Mills ........................................ 75/3 |
| 3,420,656 | 1/1969 | Mekler et al. ........................... 75/4 X |
| 3,427,148 | 2/1969 | Peters et al. ............................ 75/4 |

*Primary Examiner*—Allen B. Curtis
*Attorney*—Marn & Jangarathis

[57] ABSTRACT

The present invention discloses a process for producing strong, highly prereduced iron oxide pellets characterized by controlled size and degree of prereduction. Production of such pellets by known processes has failed to achieve economical commercial application. Pelletizing of finely divided ore, carbon, and inexpensive liquid carbonaceous binder is disclosed. The resulting green pellets are heated under conditions leading to coking of the binder and recovery of the cracked vapors which are subsequently fractionated into gaseous fuel and marketable byproduct liquid distillates. The coked pellets are then further heated to achieve the desired degree of reduction. The solid carbon introduced into the pelletizing step is preferably generated from the same liquid carbonaceous binder by spraying same onto hot powder under nonpelletizing conditions.

9 Claims, 1 Drawing Figure

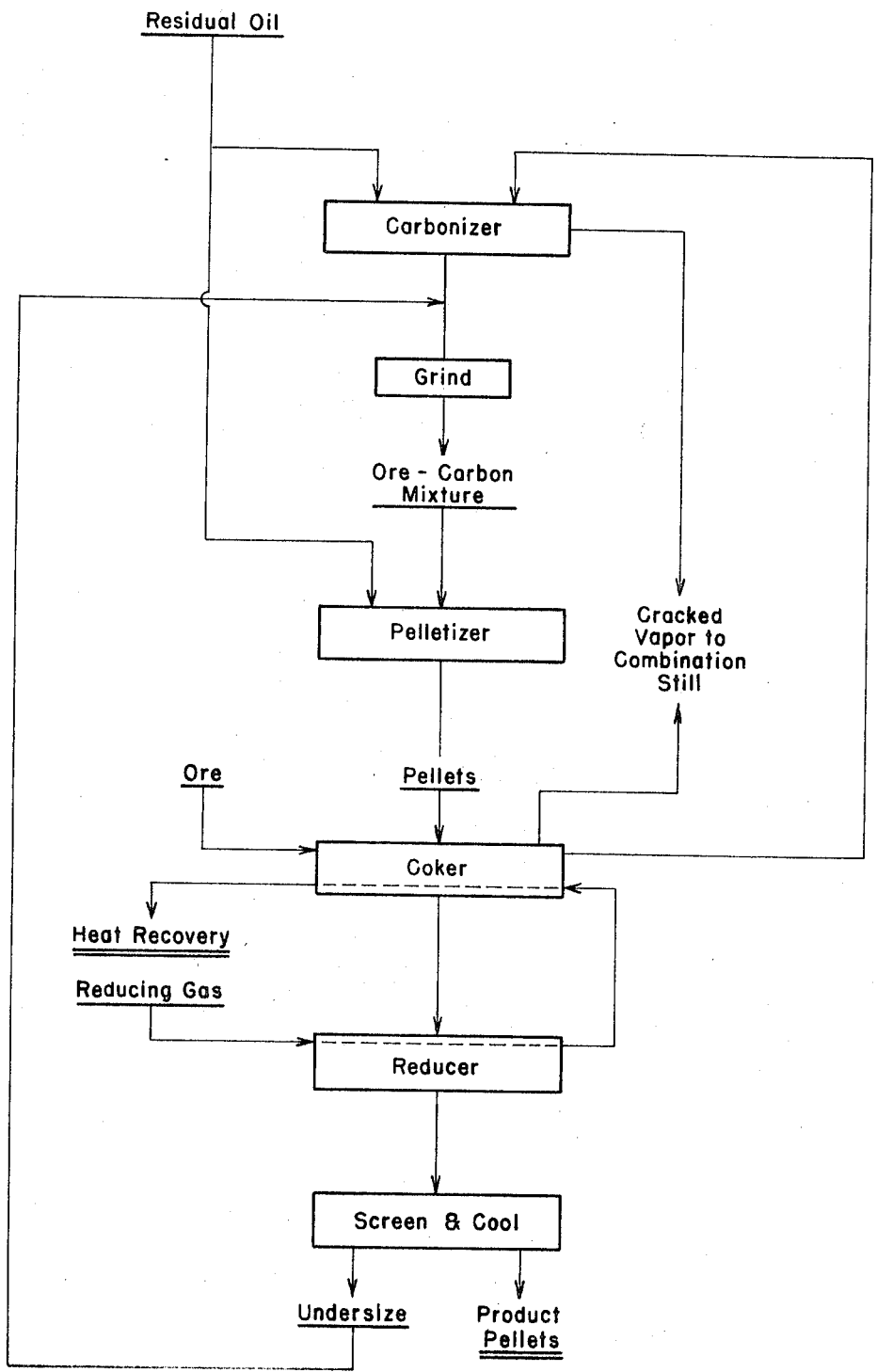

PROCESS FOR THE PRODUCTION OF HIGHLY PREREDUCED OXIDE PELLETS

BACKGROUND OF THE INVENTION

In U.S. Pat. No. 3,420,656, issued on Jan. 7, 1969 and assigned to the same assignee as the instant application, there is described a process wherein finely divided iron ore is mixed with a fluid carbonaceous material and agglomerated into pellets at a temperature in the range of 400°–650° F. The carbonaceous material should have a 5 percent boiling point of at least 650° F., and the pellets thus formed are thereafter coked at a temperature in the range of 700°–1,000° F. to drive off volatile components, which are recovered. The coked pellets are indurated and partially reduced in a kiln at 1,500°–2,200° F., and the resulting pellets are very strong, contain little or no free carbon, have less than 5 percent metallic iron, the balance being mainly FeO.

Partially reduced pellets of the above-described type are most useful as a blast furnace feed, and can be used as a portion of the ore burden or all of it. The blast furnace is a very efficient reducing device, and does not require, or benefit from, using a very highly reduced burden (see, on this point, Agarwal and Pratt, "The Thermodynamic Aspects of Using Partially Reduced Burdens," Transactions, AIME Ironmaking Conference, 1965).

By comparison to the blast furnace, the electric furnace is not a very efficient reducing device, but it is an excellent melter. Thus, the electric furnace benefits substantially from using highly prereduced charges. (As used herein, the expression "highly prereduced" is intended to mean at least 80 percent metallization). There are many areas where electric furnace steelmaking is economically attractive, and much effort has been expended in recent years on methods of producing highly metallized pellets for use as charge stock in such installations While several methods have reached commercial scale usage, there are many problems. Some processes employ rotary kilns and some employ travelling grates or other devices wherein the pellets are quiescent during reduction. Pellet degradation is less of a problem in the latter, but the devices are expensive to install and maintain, production rates tend to be low, and in at least one instance the product pellets tend to be pyrophoric.

Most of the prior art processes utilize coal or coke as the reductant. The above-noted patent, on the other hand, uses a liquid carbonaceous material such as a residual oil, and/or a coal tar pitch. There are several advantages to using residual oils and like materials as a reductant. The main advantage is that the cracked vapors can be recovered and sold as high-grade byproducts. Under the right circumstances, the value of these byproducts is at least equal to the cost of the liquid carbonaceous feedstock, and the carbon layed down and used as reductant is essentially a no-cost item. Another advantage of using hydrocarbon oils is that they eliminate the need for other binders. Also, the resulting coke structure in the pellets is fine grained and evenly dispersed, making reduction more uniform.

It is not possible to produce highly prereduced pellets successfully by following the teachings of the above-noted patent and merely increasing the oil-to-ore ratio. This is because the volume of vapors which evolve from pellets so formed during the coking step is so great that many pellets literally explode. This degradation is sufficiently extensive to make the process unattractive.

OBJECTS OF THE INVENTION

The principal object of the present invention is to provide an economic process for producing high prereduced pellets wherein a fluid hydrocarbon is used to provide all or part of the reductant.

Other objects and advantages of the invention will become clear from the following description of embodiments thereof, and the novel features will be particularly pointed out in connection with the appended claims.

DESCRIPTION OF EMBODIMENTS

The objects of the invention are accomplished by initially spraying liquid carbonaceous feedstock at a high temperature on preheated ore, so that the oil cracks on contact with the ore. Under these conditions, little or no agglomeration takes place, but an evenly dispersed ore-carbon mixture results. This mixture is then fed to a pelletizer maintained at a lower temperature, where additional residual oil is sprayed thereon, with little or no cracking taking place, and pellets are formed. The amount of volatile material in these pellets is sufficiently low so that vapor evolution during coking does not cause significant size degradation to occur. The pellets are passed to a coker where the volatile content of the pellets is cracked and driven off. The coked pellets contain sufficient carbon to achieve the desired degree of reduction of iron oxides in the pellet. The coked pellets are then passed to a reduction kiln. After reduction, the reduce pellets are screened and cooled. Cracked gas is recovered from the carbonizer and the coker and supplied to a fractionator, from which byproducts are recovered.

Perhaps the most surprising aspect of the present invention is the discovery of the temperature dependence of certain pelletizing procedures. Thus, it has been found that if a residual oil is sprayed onto an ore and the temperature of the system is well below the incipient cracking temperature of the oil, agglomeration will occur readily. If the temperature is raised above the cracking temperature, however, little or no agglomeration takes place. Instead, a mixture of fines containing much carbon is produced. Apparently, above the cracking temperature the oil loses binding ability, probably as a result of sharply lower surface tension and viscosity.

The first step of the invention may be carried out in a rotating drum equipped with means for injecting hot oil and exhaust ducts for collecting cracked vapor. It is preferable to deliver the oil at a temperature where it flows readily but below its cracking temperature. With many residual oils, a temperature in the range of 300°–750° F. is satisfactory. The finely divided ore is heated to a much higher temperature, 900°–1,300° F. Because of heat exchange, the net temperature is usually in the 800°–1,000° F. range. The oil is sprayed onto the agitated ore and cracks immediately on contact therewith. Since the carbon is laid down on the ore particles, the particles will grow in size even though little if any agglomeration takes place. It is therefore desirable to grind the carbonized mixture in order to provide a proper feed size for the pelletizing step. Feed to the pelletizer is preferably 50–80 percent minus 325 mesh. It is desirable to limit oil injection into the pelletizer to that level which leads to optimum pelletizer operation and best green pellet properties, usually 7 to 25 wt. percent of the solids feed.

Pelletizing is carried out with the ore-carbon mixture and the residual oil at a temperature of 500°–800° F. (preferably 600°–750° F.), though variations may occur with particular oils. Desired pellet size is usually in the one-quarter-inch to 2-inch range, depending on end use. Any of the well-known types of pelletizers that can operate at elevated temperatures can be employed in this step.

The green pellets are conveyed while hot directly to the coking kiln. The kiln must be indirectly fired so as to permit recovery of gases resulting from cracking of the hydrocarbon binder. In the kiln the temperature of the pellets is raised to about 900°–1,400° F., preferably 1,000°–1,300° F., and hard strong pellets are produced having a fine-grained coke structure. The total amount of residual oil used in the carbonization and pelletizing steps is controlled so that the carbon content of the pellets equals, approximately, the stoichiometric quantity required for the desired degree of reduction. It is convenient and economical to use the exhaust gas from the reduction kiln, with supplementary fuel as required, to heat the coking kiln.

The hot, coked pellets discharged from the coker are passed directly to the reduction kiln, which may be a direct fired rotary kiln. In this kiln the temperature of the pellets is raised to above 1,800° F., but below the point of incipient fusion, which is generally above 2,200° F. Preferred temperatures are in the range of 1,900°–2,000° F., which insures fast, solid state reduction but is below the temperature where any fusion can occur or where the pellets might tend to stick together.

The reduced pellets are cooled to a temperature below about 600° F. in a protected, nonoxidizing atmosphere, and undersize pellets are screened out and recycled.

It is to be noted that the coking, reduction, and cooling steps may be carried out in the manner described in the above-noted patent. Many variations, however, are possible: It will be appreciated that an intimate ore-carbon mixture may be prepared by mixing any low-volatile carbonaceous material with the ore. Finely ground low-volatile coal or coke may be used in this service. Fluxes and sulfur-acceptors or substances conducive to sulfur elimination may be added to the ore-carbon mixture. The pellets are more fragile in the coking stage than in reduction, and pellet degradation is reduced by embedding the pellets in a bed of finely divided material. By using ground iron-ore as the finely divided material, two purposes are served: pellet breakage is reduced and the ore is preheated to just about the right temperature for us in the carbonization step. Further, any fines that are formed during coking are automatically recycled. The use of a bed of fines is also believed to be advantageous in bringing about rapid heating and quick formation of carbonaceous ligaments, and contributes to pellet integrity during the coking step.

The attached drawing is a simplified schematic flow sheet illustrating an embodiment of the invention, and may be referred to in conjunction with the following specific example.

Taconite ore is the raw material, and analyzes 64.2 percent Fe. The ore is 80 percent minus 325 mesh (Tyler screen) as received).

Initial experiments aimed at achieving high prereduction followed two approaches. Pellets were prepared using a high binder-to-ore ratio to introduce sufficient carbonaceous constituent to support and achieve the desired level of reduction. This resulted in difficulties in pelletizing and disintegration of the pellets upon heating in the subsequent coking step.

A subsequent approach consisted of pelletizing at temperatures sufficiently high to induce partial cracking of the binder. While better pelletizing yields obtained, problems persisted. This mode of operation required critical temperature control and the "green" pellets suffered excessive disintegration during coking treatment. However, these experiments demonstrated, during accidental upward temperature excursions, that it is possible to achieve coking of the binder by spraying it onto hot powder yielding solid carbon in convenient form for us in the process subsequently described. The solid carbon formation may be controlled to yield product mostly in powder form, with some flakes which are readily comminuted to the desired particle size range. If the binder is sprayed upon hot ore fines, much of the carbon is deposited on the ore particles. Alternatively, the binder may be sprayed on hot recycled carbon powder.

By spraying carbonaceous liquid onto hot ore in a rotating drum under the nonpelletizing conditions described above, viz, at a temperature such that substantial cracking takes place, it was possible to produce a mixture of ore and solid carbon. When this mixture, after suitable particle size adjustment was fed to a pelletizing drum at a lower temperature with a spray of carbonaceous liquid in a ratio of about 20 wt. percent of the solids, pelletizing was easily achieved and the resulting pellets exhibited good strength and integrity through subsequent processing steps, and contained sufficient carbon to support a high level of prereduction. The process herein disclosed in based on the above findings.

In the preferred first step, a carbonaceous liquid is sprayed upon hot powder under nonpelletizing conditions at a temperature sufficiently high to achieve substantial cracking. Cracked vapors are passed from this operation to a "combination still" for fractionation and recovery.

In a subsequent pelletizing operation the ore-carbon powder generated, as described above, or a mixture of carbon and ore powder is fed with a spray of carbonaceous liquid in conventional pelletizing equipment designed to permit operation at elevated temperatures.

The hot ore, at about 1,200° F., is fed to the carbonizing kiln, where a 7.4° A.P.I. gravity oil is sprayed onto it. The oil is preheated to 600° F. before spraying, and cracks on contact with the ore.

Alternatively, the carbonizing kiln may be operated with a recirculating load of hot finely divided carbon. The carbonaceous liquid is sprayed as described above, resulting in formation of more carbon. Cracked vapors are recovered. The effluent solids are sized and screened, a portion passing to the pelletizing step. The remainder is reheated by exchange against hot process streams and recirculated to the carbonizer.

Recycled undersize pellets and fines generated in the process are ground to about 80 percent minus 325 mesh size. The "carbonizer" product solids may be admixed with the recycle as feed to the grinders.

The mixture at this stage, at a temperature of 700°–850° F., is passed to the pelletizing drum, where additional quantities of the oil are sprayed on and pellets are formed. The pellets contain 7.6 percent solid carbon and 13.2 percent residuum.

The hot pellets, which are mostly in the three-eighths- to five-eighths-inch size range, are conveyed to the coker. As a bed for the pellets during coking, a circulating load of hot sand may be employed. The coker discharge is screened and the sand is recirculated.

Reduction of the coked pellets is carried out in the same manner as described in the above-mentioned U.S. Pat. In this instance, metallization was 81.3 percent, and all carbon in the pellets was found to have been consumed. The pellets had a cold crushing strength in the range of 350–1,000 pounds. The results of two runs are summarized in Table I below. In this instance, the ore was 67.2 wt. percent Fe and 5.0 wt. percent $SiO_2$ etc. The ore was crushed to 78.3 percent minus 325 mesh. A residual oil having an °A.P.I. gravity of 8.6 and a Conradson carbon of 18 percent was employed.

TABLE I

|  | Run A | Run B |
| --- | --- | --- |
| Pelletizer Temp. °F. | 720–755 | 720–750 |
| Green Pellet Composition, wt. % |  |  |
| Ore | 79.55 | 82.15 |
| Coke (from carbonizer) | 8.12 | 5.95 |
| Resid | 12.33 | 11.90 |
| Reduction, % | 99.85 | 78.4 |
| Metallization, % | 99.8 | 68.8 |
| Product Pellet Crush Strength | 1,000 lb. | 350–400 lb. |

It is to be emphasized that the initial ore-carbon mixture can be made in several ways. One way is that shown in the drawing. Or, the ore can be mixed directly with ground coke. Another way is to spray residual oil into a carbonizer onto hot particles of a material other than ore, such as coke or alumina pellets. The deposited carbon can then be removed by subsequent grinding, the pellets being recirculated to the carbonizer.

Various changes in the details, steps, materials and arrangements of parts, which have been herein described and illustrated in order to explain the nature of the invention, may be made by those skilled in the art within the principle and scope of the invention as defined in the appended claims and their equivalents.

What is claimed is:

1. A process for the production of highly prereduced oxide pellets comprising:
   forming a mixture of finely divided oxidic ore and finely divided carbon under nonagglomerating conditions, the quantity of said carbon being less than the stoichiometric amount required for complete reduction said ore;

pelletizing said mixture by spraying a fluid carbonaceous material thereon while agitating same, said carbonaceous material being heated to a flowable temperature and maintaining the temperature in the pelletizing mixture below the cracking temperature of the fluid carbonaceous material used;

coking the pellets thus formed by indirectly heating the same to a temperature of about 900° to 1,300° F., and heating said coked pellets to reduction temperatures for a period sufficient to effect high prereduction and metallization thereof, the coked pellets thereby containing about the stoichiometric quantity of carbon required to effect said high preduction and metallization thereof as a result of controlling the addition of carbonaceous materials in said forming and pelletizing steps.

2. The process as claimed in claim 1, wherein said forming step is carried out by spraying a heated residual oil onto a bed of said ore, said ore being preheated to a temperature above the cracking temperature of said oil, whereby said oil cracks on contact with said ore and lays down carbon thereon, and additionally comprising recovering the cracked vapors produced.

3. The process as claimed in claim 2, wherein said ore is preheated to about 1,000° to 1,300° F. and said oil is preheated to about 300° to 700° F.

4. The process as claimed in claim 1, wherein a residual oil is used in said pelletizing step and is preheated to about 400° to 650° F., and said pelletizing step is carried out in a rotating drum under conditions controlled to avoid significant cracking of said oil.

5. The process as claimed in claim 1, wherein said coking step is carried out in an indirectly fired rotating kiln, and cracked vapors produced therein are recovered.

6. The process as claimed in claim 5, and additionally comprising passing said pellets through said kiln in a bed of hot granular, nonreactive material of particle size substantially smaller than the particle size of the pellets, thereby minimizing degradation of said pellets.

7. The process as claimed in claim 6, wherein said material is a recirculating load of sand.

8. The process as claimed in claim 1, and additionally comprising grinding said mixture, prior to pelletizing, to at least 40 percent minus 325 mesh.

9. The process as claimed in claim 1, wherein said reduction step is carried out in a direct-fired rotating kiln maintained with a reducing atmosphere, and hot reducing gases produced therein are partially burned with an oxygen-containing gas to provide a portion of the heat requirements for said coking step.

* * * * *